US005542779A

United States Patent [19]
Ono

[11] Patent Number: 5,542,779
[45] Date of Patent: Aug. 6, 1996

[54] WAVE-DAMPING UNDERWATER TRUSS STRUCTURE

[76] Inventor: Taisaburo Ono, 351-1 Ninomiya, Ninomiya-machi, Naka-gun, Kanagawa-ken, Japan

[21] Appl. No.: 219,370

[22] Filed: Mar. 29, 1994

[51] Int. Cl.⁶ ..................................... E02B 3/06
[52] U.S. Cl. ................. 405/33; 405/30; 405/25; 405/21
[58] Field of Search ................... 405/21, 25, 27, 405/29, 30, 35, 33; 52/673, 653.1, 655.2, 648.1; 74/434, 572, 573 R, 573 F, 574; 446/233; 74/572, 573 R, 573 F, 574

[56] References Cited

U.S. PATENT DOCUMENTS

| | | | |
|---|---|---|---|
| 3,548,600 | 12/1970 | Stolk, Jr. et al. | 405/30 |
| 3,755,829 | 9/1973 | Walklet | 405/35 X |
| 4,074,497 | 2/1978 | Ono . | |
| 4,130,994 | 12/1978 | Van Moss, Jr. | 405/27 |
| 4,431,337 | 2/1984 | Isawa | 405/21 |
| 5,123,780 | 6/1992 | Martinsen | 405/30 |

FOREIGN PATENT DOCUMENTS

| | | | |
|---|---|---|---|
| 0758321 | 5/1967 | Canada | 405/29 |
| 0119815 | 9/1980 | Japan | 405/30 |
| 63-247413 | 10/1988 | Japan . | |
| 270812 | 3/1990 | Japan . | |

*Primary Examiner*—Michael Powell Buiz
*Assistant Examiner*—Frederick Lagman
*Attorney, Agent, or Firm*—Sixbey, Friedman, Leedom & Ferguson, P.C.; Gerald J. Ferguson, Jr.; David S. Safran

[57] ABSTRACT

A wave-damping underwater truss structure for simultaneously resolving all problems such as the damping of undulation including sluggish waves and the reduction of weight and cost of members. That truss has a number of brims, each having a plurality of openings with rugged rim or rims. The opening is circularly or rectangularly formed.

5 Claims, 4 Drawing Sheets

WAVE-DAMPING UNDERWATER TRUSS STRUCTURE

BACKGROUND OF THE INVENTION

1. Field of the Invention

This invention relates to an improved wave-damping underwater truss structure, and more particularly to an improved wave-damping underwater truss structure, in which an underwater truss includes a number of diagonal members arranged not parallel with each other and provided with one or more disc-shaped flanges (hereinafter referred to as a brim).

2. Description of the Prior Art

A wave-damping underwater truss structure is a lightweight offshore structure that substitutes for offshore structures such as a caisson breakwater and a tetrapod, whose wave-damping effects are attributable to their weight. This structure was invented by the present applicant so that it can inexpensively cope with weak ground. The principle structure of this wave-damping structure is disclosed in U.S. Pat. No. 3,864,049, and various types of improved structure of the wave-damping structure are disclosed in U.S. Pat. No. 4,074,497, Japanese Patent Publication 63(1988)-247413, Japanese Utility Model No. 1(1989)-180530 and Japanese Unexamined Patent Publication No. 2(1990)-70812.

Shafts and ball members are combined together to constitute a pyramid-shaped basic constitution such as an equilateral triangular pyramid, a square pyramid or the like. The shaft is provided with a brim or brims to increase a contact area per unit volume with which fluids come into contact, whereby the wave-damping capability of the truss structure is improved. This makes it possible to rationalize the entire size and economical efficiency of the structure to a much greater extent. The wave-damping underwater truss structure utilizes the feature wherein when waves pass through the underwater truss structure, the shape of the structure interferes with, and disturbs, the movement of the waves, so that the waves become turbulent and disappear as a result. This structure is characterized in that it serves as a wave-damping structure having a permeability for undulation.

In principle, this wave-damping structure can be expected to yield a considerable wave damping effect by changing undulation to turbulence and swirls. Because of its features, i.e., a relatively light weight, it is desired that this wave-damping underwater truss structure be put into practice. To this end, further advantageous improvements in the wave-damping structure are expected.

In the case of an existing wave-damping underwater truss structure that has been studied and developed up to the present, it is acknowledged that relatively small waves produced in a laboratory, that is, wave components having a high kinetic energy per unit spacing are damped to a significant extent. However, it came to light that such an existing wave-damping structure cannot sufficiently cope with sluggish waves such as "Tsunami", or tidal waves, and swell practically seen in the ocean. The existing wave-damping structure encounters the next problem of further improving the wave damping effect on these sluggish wave. It is considered especially difficult for a permeable wave-damping structure to dampen tsunami (tidal waves). Even a breakwater produced by the conventional gravimetoric method is also costly and technically limited. It is expected that a great depth breakwater having a truss constitution, which is eminently superior to a conventional one in reduced cost and construction period, will cope with the sluggish waves before the tsunami energy is excessively concentrated when the sluggish waves approach the seashore, so that the energy is wasted. In this point, however, this permeable wave-damping structure has an unchanging large permeability to the waves, thereby impairing the entire wave damping effect. For this reason, a drastic solution of such a problem is awaited.

SUMMARY OF THE INVENTION

In view of the foregoing observations and descriptions, the object of this invention is to facilitate the construction of a wave-damping structure and a reduction in the construction period thereof by improving the effective damping of all undulation including sluggish waves and reducing the weight of the structure to a much greater extent, and also to reduce the cost of the structure by saving members, thereby simultaneously resolving all problems.

In other words, the object of this invention is to provide a brimmed wave-damping underwater truss structure that causes the kinetic energy of "Tsunami", swell or the like to be effectively wasted, and which is reduced in weight.

To this end, according to one aspect of this invention, the present invention provides a wave-damping underwater truss structure comprising:

diagonal shaft members;

ball members provided on the vertex of the truss-shaped structure for joining together said diagonal shaft members in the form of a truss; and one or more brims formed on at least some of said diagonal shaft members, wherein the improvement further comprises a plurality of openings provided in said brim, said openings having rugged rim or rims.

According to a second aspect of this invention, the present invention provides a brimmed wave-damping underwater truss structure characterized in that a plurality of openings with rugged rim or rims are formed on a brim.

These openings may be circularly formed like an oval, or rectangularly formed. More rational designing of the opening is effected by selecting the number and shape of the opening in accordance with the location where the structure is installed and also the purpose of that installation.

The rugged rim may be formed on either the front or the rear side of the periphery of the opening or on both sides of the same. Alternatively, irregularities may be formed along the internal circumferential surface of the opening. The cross-sectional view of these irregularities include a number of triangles, and the irregularities should preferably comprise a plurality of acute-angled continuous irregularities or angularities.

The wave-damping underwater truss structure according to this invention includes diagonal shaft member provided with a brim or brims, each having openings with rugged rim or rims, and hence the openings lead to the significant reduction of material used for the brim. The rugged pattern formed around the opening causes a swirl resulting from the disturbance of the brim to be divided into a number of smaller swirls when the swirl passes through that opening. The rate of smaller swirls is increased during the splitting process of eddy motion in a cascade manner. The viscous friction of the swirl promotes the conversion of kinetic energy to heat energy, thereby depleting the kinetic energy. The rim or rims formed around the opening compensate for a reduction in strength of the brim.

In this invention, the openings formed on the brim prevent the occurrence of cavitation which will be caused by a brim without openings, and hence damage to members of the structure can be advantageously suppressed.

The irregularities formed along the rim of the opening in the brim can reduce viscosity resistance of all resistance which the brim offers to a stream in an advantageous manner to a much greater extent, whereby pressure drag is reduced. Such a rugged pattern formed on the surface yields effects similar to those put forward in Japanese Unexamined Patent Publication No. 63(1988)-247413 owned by the present applicant.

DETAILED DESCRIPTION OF THE INVENTION

Referring to the accompanying drawings, embodiments of a wave-damping underwater truss structure according to this invention will now be described.

Figure 1:
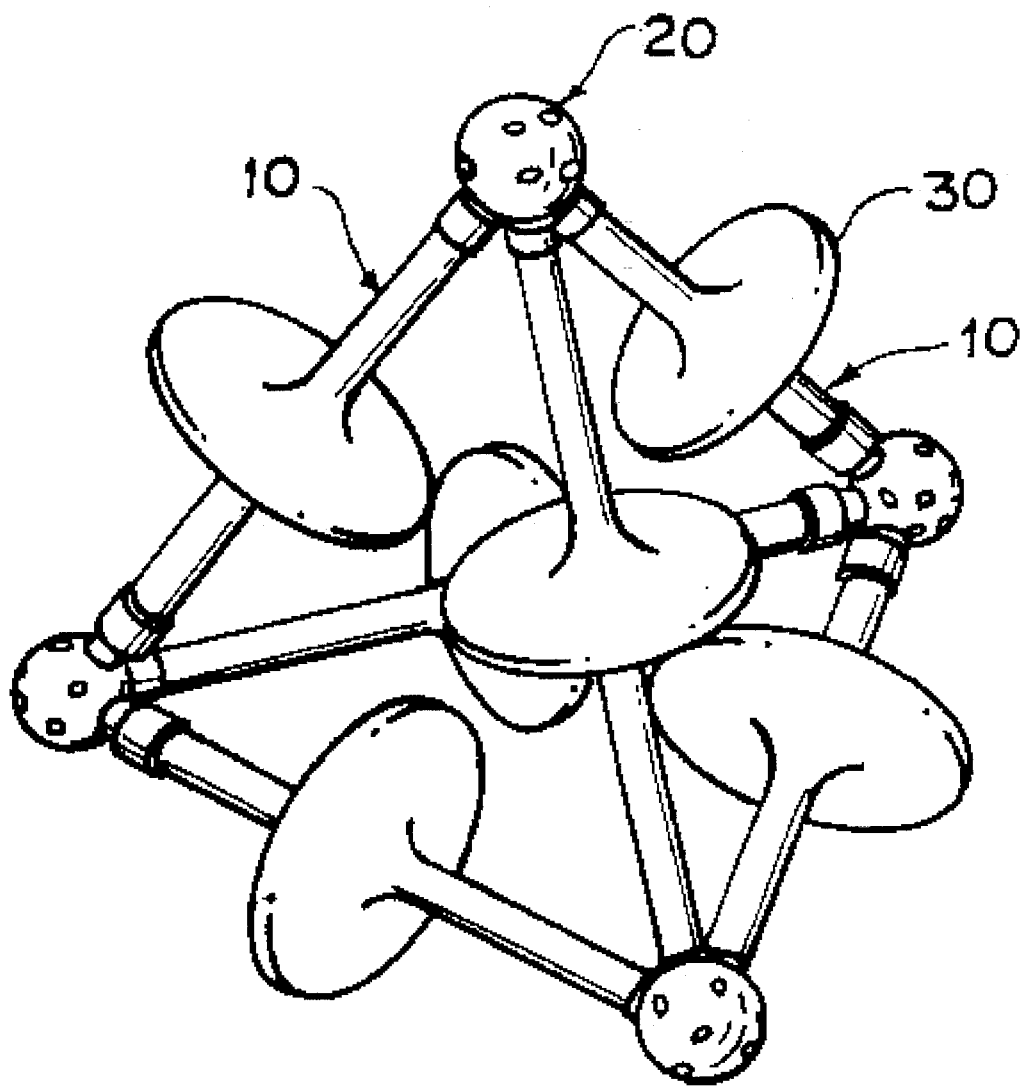
FIG. 1 is a perspective view showing a brimmed constitution which is one of basic structures making up an underwater truss structure.

FIG. 1 is a perspective view showing a brimmed underwater truss structure which is one of the basic structures making up a wave-damping underwater truss structure. This brimmed underwater truss structure is assembled by the combination of six shafts 10, each having at least one brim 30 located at the axial center thereof, with four ball members 20 in such a way that an equilateral triangular pyramid is made up with the ball member 20 positioned at the vertex thereof. FIG. 1 shows the fixed brim 30, but the brim 30 may be resiliently attached to the shaft 10. In addition, the number of brims 30 to be attached to the shaft 10 can be increased.

The resilient attaching of the brim 30 to the shaft 10 is disclosed, in detail, in Japanese Utility Model Publication 1(1989)-180530. For simplicity, openings formed on the brim 30 which are constituent elements of this invention are not shown in FIG. 1.

Figure 2:
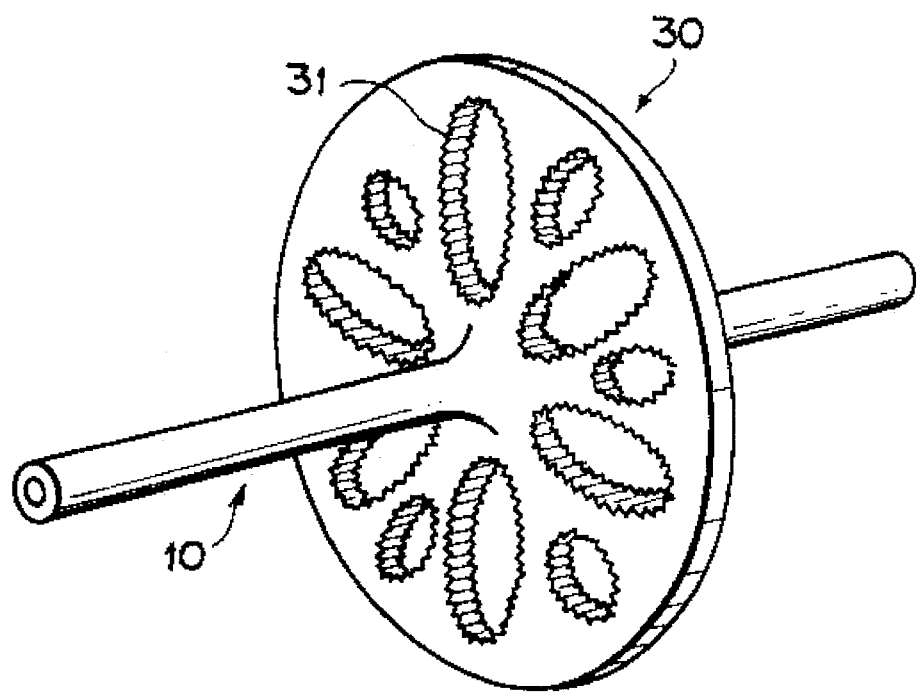
FIG. 2 is a perspective view showing brimmed shafts used with an underwater truss structure according to a first embodiment of this invention.
Figure 3:
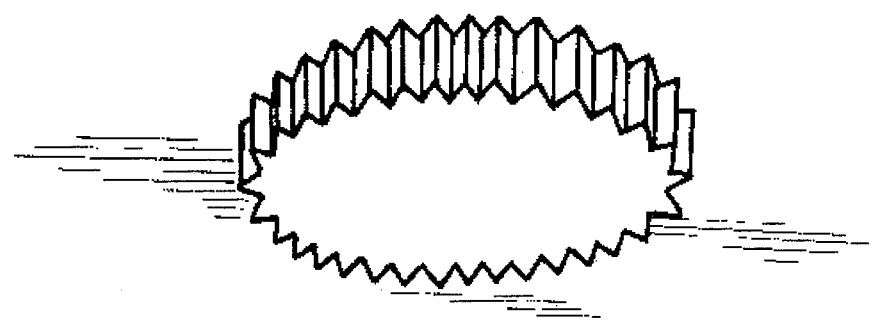
FIG. 3 is an enlarged perspective view showing an opening shown in FIG. 2.

FIG. 2 is a schematic representation showing a brimmed shaft for use with an underwater truss structure according to a first embodiment of this invention; and FIG. 3 is an enlarged view showing the opening shown in FIG. 2.

As shown in FIG. 2, the brim 30 fixed to the shaft 10 in an integrated fashion or in a separated way is provided with openings 31 having rugged rims (where the term "rugged" is used in its definitional sense of being rough or uneven as opposed to that meaning sturdy or strongly built). These openings are circular or oval in shape, and twelve openings are formed along one brim 30.

The rugged rim may be formed along the periphery of the opening 31, and particularly formed along the inner circumferential surface of the opening 31 as shown in FIGS. 2 and 3. The rugged rim may be formed on either the front or the rear surface of the brim around the opening 31, or may be formed on both sides of the brim.

FIGS. 4, 5, 6 and 7 show an example in which the rugged rim is formed on either the front or the rear surface of the brim along the opening 31 or on both sides of the brim.

Figure 4:
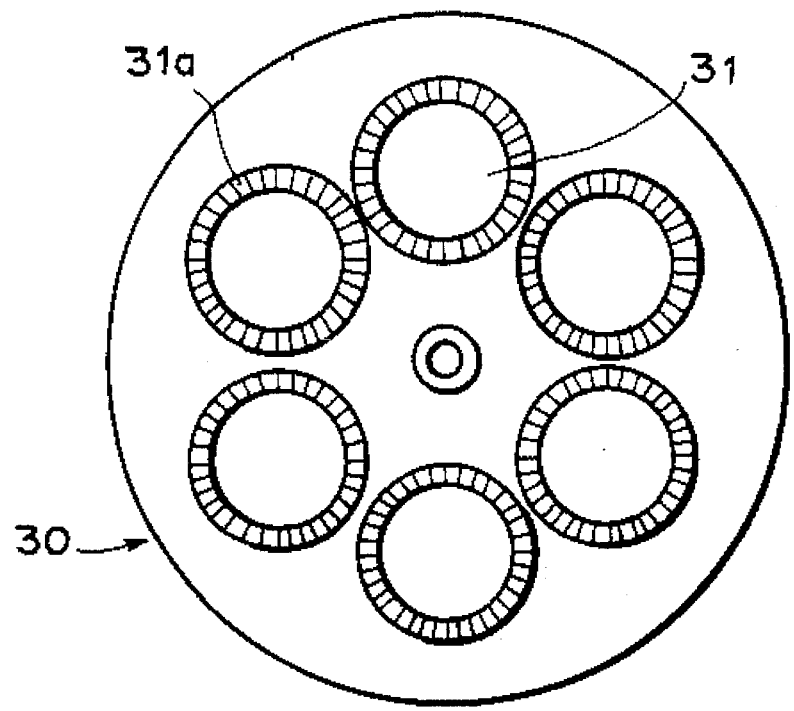
FIG. 4 is a front view showing a brimmed shaft used with an underwater truss structure according to a second embodiment of this invention.
Figure 5:
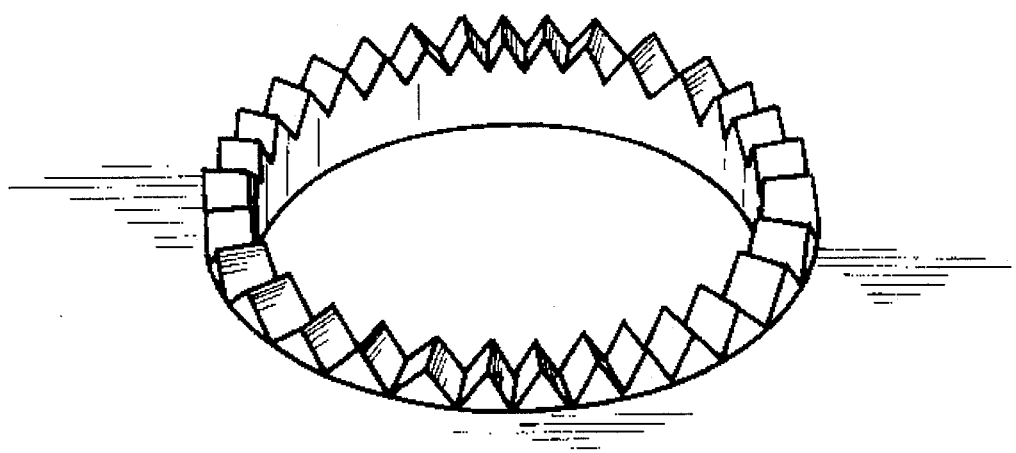
FIG. 5 is an enlarged perspective view showing an example of irregularities formed along the rim of the opening shown in FIG. 4.
Figure 6:
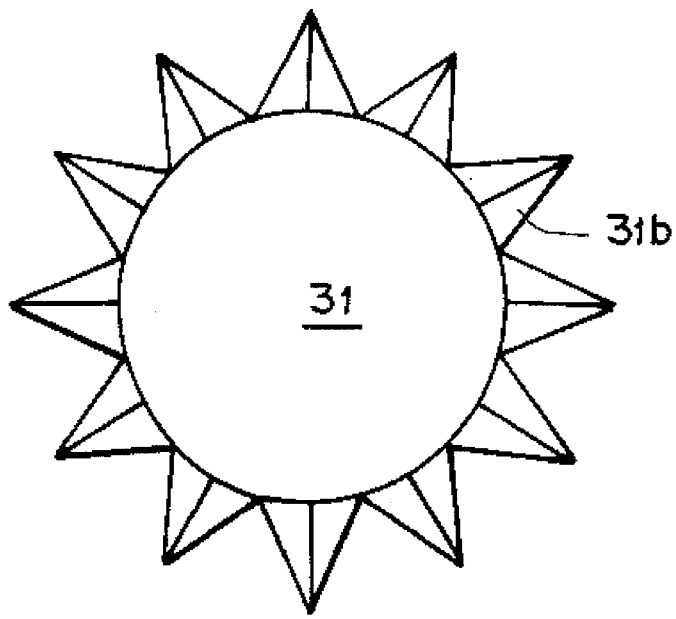
FIG. 6 is an enlarge front view showing another example of irregularities formed along the rim of the opening.
Figure 7:
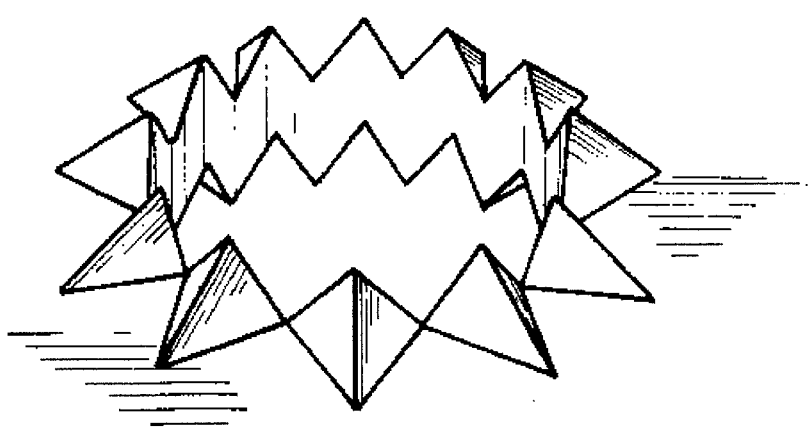
FIG. 7 is an enlarged perspective view showing details of the configuration of the irregularity formed along the rim of the opening shown in FIG. 6.

FIG. 4 is a front view showing the brim 30. Annular irregularities 31a are formed on the brim surface along the periphery of each of six openings 31. FIG. 5 is an enlarged perspective view showing the irregularities. In the case shown in FIG. 5, the irregularities are formed only on one side of the brim surface, but These irregularities may be formed on both sides of the brim. FIGS. 6 and 7 show an example in which a number of triangular pyramids are formed on both sides of the brim. FIG. 6 is an enlarged front view showing the opening 31, and FIG. 7 is an enlarged perspective view showing the same. In this example, the irregularities are formed on both sides of the brim.

These irregularities include a number of triangles, and should preferably comprise a plurality of acute-angled continuous triangles. FIGS. 6 and 7 show an example of such irregularities. For instance, a number of openings with rugged rims are formed on the surface of a plastic radish grater. These look similar to the example shown in FIG. 7.

The brim 30 having a large diameter is formed at the center in the direction of the axis of the shaft 10. This brim 30 is produced by joining together, for example, two front and rear members having the same shape, and the brim is resiliently attached to the shaft 10 with packing, which is made of a resilient material, being sandwiched between them. Japanese Patent Publication No. 1(1989)-180530 describes the constitution of the joined part between the brim 30 and the shaft 10 in detail.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A wave-damping underwater truss structure comprising:

diagonal shaft members;

ball members provided at the vertex of the truss-shaped structure for joining together said diagonal shaft members in the form of a truss; and one or more brims formed on at least some of said diagonal shaft members, wherein the improvement further comprises a plurality of openings formed in said brim, each of said openings having a rim with a rough or uneven surface which includes a number of angularities.

2. A wave-damping underwater truss structure having a number of diagonal shaft members that are not parallel to each other and are provided with a brim or brims, said structure characterized in that a plurality of openings, each of which is provided with a rim with a rough or uneven surface which includes a number of angularities, are formed on said brim.

3. A shaft member with a brim or brims for an underwater wave-damping structure, wherein at least one of said brim or brims has a plurality of openings, each of which is provided with a rim with a rough or uneven surface having a surface configuration which constitutes a means for producing a reduction in viscosity resistance relative to that of a smooth surface.

4. A wave-damping underwater truss structure comprising:

diagonal shaft members;

ball members provided at the vertex of the truss-shaped structure for joining together said diagonal shaft members in the form of a truss; and one or more brims formed on at least some of said diagonal shaft members, wherein the improvement further comprises a plurality of openings formed in said brim, said openings having a rim with a surface configuration which constitutes a means for producing a reduction in viscosity resistance relative to that of a smooth surface.

5. A wave-damping underwater truss structure as defined in claim 4, wherein said surface configuration comprises a plurality of irregularities formed along the circumference of the opening.

* * * * *